United States Patent [19]
Schmed

[11] Patent Number: 5,615,602
[45] Date of Patent: Apr. 1, 1997

[54] EMULSIFYING UNIT, PARTICULARLY FOR EMULSIFYING AIR AND MILK WITH STEAM TO PREPARE CAPPUCCINO AND THE LIKE

[75] Inventor: Arthur-Joachim Schmed, Oberdürnten, Switzerland

[73] Assignee: J. Lough Limited, Dublin, Ireland

[21] Appl. No.: 574,993

[22] Filed: Dec. 19, 1995

[30] Foreign Application Priority Data

Dec. 27, 1994 [CH] Switzerland .......................... 03939/94

[51] Int. Cl.$^6$ .................................................. A47J 31/40
[52] U.S. Cl. .................. 99/323.1; 99/293; 261/DIG. 16; 261/DIG. 76
[58] Field of Search .................................. 99/323.1, 293, 99/294, 300, 302 R, 279, 304; 426/433; 261/DIG. 76, DIG. 16

[56] References Cited

U.S. PATENT DOCUMENTS

| | | |
|---|---|---|
| 4,715,274 | 12/1987 | Paoletti . |
| 4,852,473 | 8/1989 | Domingo ............................... 99/323.1 |
| 4,960,042 | 10/1990 | Grossi ...................................... 99/293 |
| 5,330,266 | 7/1994 | Stubaus . |
| 5,335,588 | 8/1994 | Mahlich ..................................... 99/293 |

FOREIGN PATENT DOCUMENTS

| | | |
|---|---|---|
| 0243326 | 10/1987 | European Pat. Off. . |
| 0467666 | 1/1992 | European Pat. Off. . |
| 0555767 | 8/1993 | European Pat. Off. . |

*Primary Examiner*—Robert W. Jenkins
*Attorney, Agent, or Firm*—Dressler, Goldsmith, Milnamow & Katz, Ltd.

[57] ABSTRACT

An emulsifying unit, particularly for emulsifying steam, air, and milk to prepare cappuccino and the like, comprising an acceleration duct into which a steam injection nozzle leads, the acceleration duct ending with an emulsifying chamber. The acceleration duct is connected to a milk injection duct that draws from a milk container and is provided with an air injection port in a point that is spaced from the acceleration duct.

7 Claims, 1 Drawing Sheet

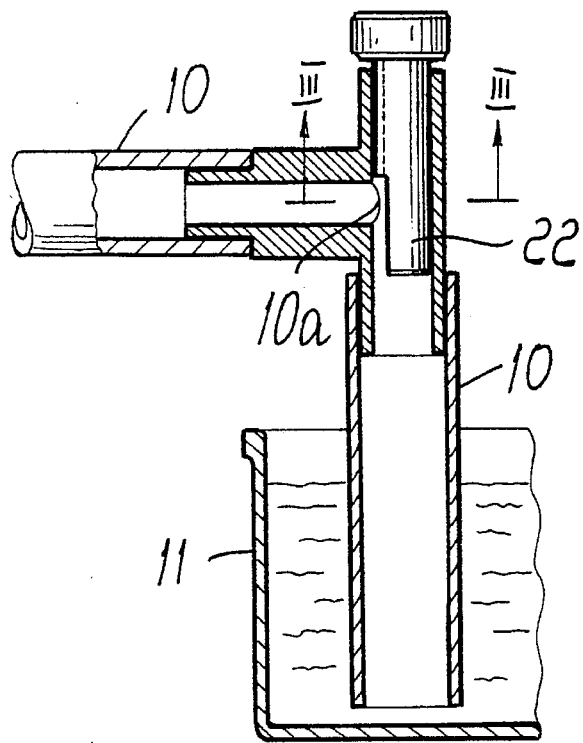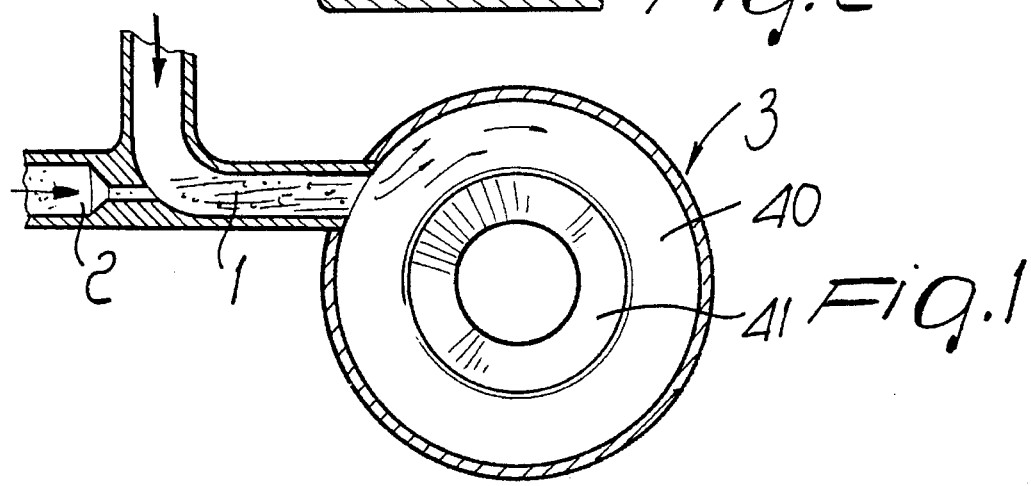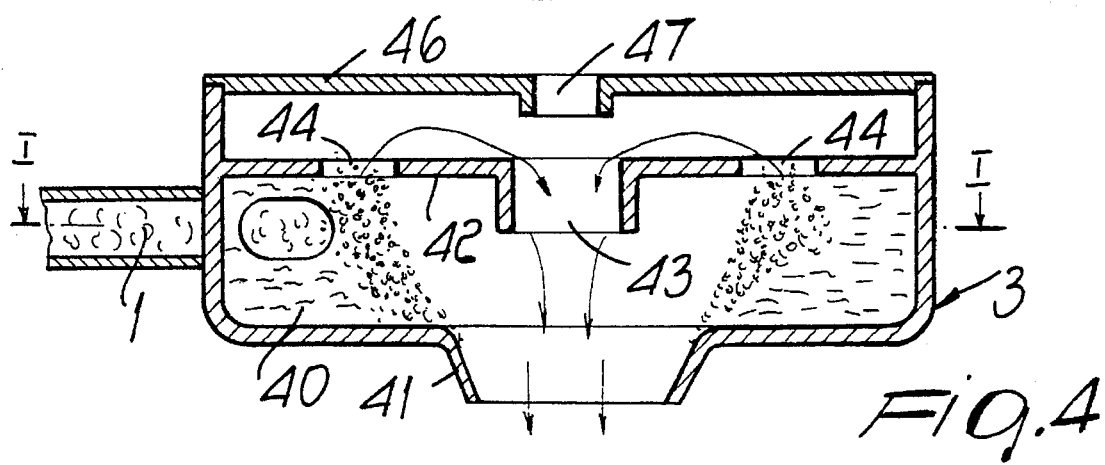

EMULSIFYING UNIT, PARTICULARLY FOR EMULSIFYING AIR AND MILK WITH STEAM TO PREPARE CAPPUCCINO AND THE LIKE

BACKGROUND OF THE INVENTION

The present invention relates to an emulsifying unit, particularly for emulsifying and heating air and milk by means of steam to prepare cappuccino and the like.

Preparing cappuccino and the like usually requires emulsifying the milk; for this purpose, the operator injects in a container of cold milk a jet of steam which is generally provided by a machine for making espresso coffee.

A certain skill is required to perform this operation so as to include in the emulsion a correct amount of air, to obtain the froth that is typical of a cappuccino in the desired consistency.

The above mentioned difficulties become even greater in the case of machines for home use, wherein the amount of steam that is produced instantaneously is normally smaller.

In order to solve the above problem, U.S. Pat. No. 4,715,274 disclosed an emulsifying unit having substantially an intake chamber into which a jet of steam is fed; a milk aspiration duct and an air aspiration duct or port end in the aspiration chamber.

Another embodiment, also disclosed in the same patent, provides for a solution wherein the jet of steam passes through an aspiration duct connected to a milk aspiration port in a first portion and to an air aspiration port in a second portion.

Both of the above mentioned solutions, despite being valid from a theoretical point of view, have severe problems in practical execution since, in order to obtain a froth having the desired consistency, it is necessary to give the air aspiration hole an extremely small size; depending on the amount of steam and milk that can be fed, the hole in fact must normally have a cross-section of a few tenths of a millimeter.

It is therefore extremely difficult to provide a gauged hole of such size and also achieve the desired precision, since even a minimal error in the size of the hole leads to a significant variation in the characteristics of the product being obtained.

Another severe drawback is constituted by the fact that the air aspiration hole is provided in the region where steam and milk flow together; therefore, in the presence of heat, films of milk form relatively easily and obstruct said hole, thus substantially modifying the air inlet cross-section.

Another problem is furthermore constituted by the fact that this arrangement entails considerable difficulties in cleaning the hole correctly.

SUMMARY OF THE INVENTION

A principal aim of the invention is to eliminate the drawbacks described above by providing an emulsifying unit particularly for emulsifying and heating air and milk by means of steam to prepare cappuccino and the like, which allows to provide an air aspiration hole having a relatively large size that does not create constructive and functional problems of any kind, and in which said hole is located in a position adapted for possible easy inspection.

Within the scope of the above aim, a particular object of the invention is to provide an emulsifying unit in which cleaning of the air aspiration hole is considerably simplified, also taking into account the fact that the air aspiration hole is provided in a region wherein the milk present is still cold.

Another object of the present invention is to provide an emulsifying unit wherein the emulsifying chamber allows to continuously and automatically remove the emulsified part in the form of froth, separating it from the predominantly liquid part.

Another object of the present invention is to provide an emulsifying unit that is considerably simplified from a constructive point of view and is furthermore capable of giving the greatest assurances of reliability and safety in use.

This aim, these objects, and others which will become apparent hereinafter are achieved by an emulsifying unit, particularly for emulsifying air and milk by means of steam to prepare cappuccino and the like, characterized in that it comprises an acceleration duct into which a steam injection nozzle leads, said acceleration duct ending with an emulsifying chamber and being connected to a milk injection duct that draws from a milk container and is provided with an air injection port in a point that is spaced from said acceleration duct.

BRIEF DESCRIPTION OF THE DRAWINGS

Further characteristics and advantages will become apparent from the following detailed description of a preferred but not exclusive embodiment of an emulsifying unit particularly for emulsifying air and milk to prepare cappuccino and the like, illustrated only by way of non-limitative example in the accompanying drawings, wherein:

FIG. 1 is a sectional view of the emulsifying unit according to the invention, taken along the plane I—I of FIG. 4;

FIG. 2 is a schematic view of the milk injection tube, showing the air injection port;

FIG. 3 is a sectional view, taken along the plane III—III of FIG. 2;

FIG. 4 is a diametrical sectional view of the emulsifying chamber.

DESCRIPTION OF THE PREFERRED EMBODIMENTS

With reference to the above figures, the emulsifying unit particularly for emulsifying air and milk by means of steam to prepare cappuccino and the like comprises an acceleration duct, designated by the reference numeral 1, into which a steam injection nozzle 2 leads; said steam originates from a steam generation unit located, for example, inside a machine for making espresso coffee.

At the other end, the acceleration duct 1 leads into an emulsifying chamber, generally designated by the reference numeral 3.

The acceleration duct is preferably axially aligned with the steam injection nozzle 2 and is arranged substantially tangentially with respect to the emulsifying chamber 3.

The acceleration duct 1 is connected to a milk injection duct, designated by the reference numeral 10, which can have any shape deemed appropriate and ends inside a milk container 11.

An important feature of the invention resides in the fact that an air injection port 20 is provided on the milk injection duct, preferably nearby the milk container 11, and is spaced apart from the acceleration duct 1.

Means are furthermore provided for adjusting the amount of aspirated milk; said means are obtained by virtue of a stem 21, whereon the port 20 is formed; the stem 21 has an eccentric portion 22 for controlling the passage gap 10a towards the duct 10.

Moreover, the size of the air injection port is preferably directly proportional to the cross-section of the milk injection duct and inversely proportional to its height with respect to the milk container 11.

With this arrangement, therefore, by arranging the air injection port in a region affected exclusively by the flow of milk and not by the flow of steam, it is possible to have air injection port dimensions that are considerably larger than in the situation in which the air injection port was directly affected by the flow of steam.

Accordingly, it is structurally much simpler to produce said port, and said port is furthermore located in a region where only cold milk flows and clogging of said port is therefore less likely to happen.

The increased size of the air injection port makes clogging less likely, and the size of the air injection port is furthermore not restricted by physical factors deriving from the conditions occurring in the intake chamber disclosed in the previously mentioned patent.

Since the air injection port is not restricted to the Venturi region that forms in the intake chamber of previous inventions, it can be arranged in any point of the milk injection duct, so that it is perfectly accessible to the user.

In addition, the emulsifying chamber 3, as shown more clearly in FIG. 4, substantially has a cylindrical chamber 40, into which the acceleration duct 1 leads substantially and tangentially; said chamber 40 has, in a downward region, an axially-arranged discharge outlet 41 and is closed in an upward region by a disk 42 provided with a discharge opening 43 that is located above the discharge outlet 41; an upper closure element 46 is furthermore provided, having an air intake 47.

The disk 42 is provided with at least one upper opening 44 that feeds the emulsified product onto the disk 42 and then sends it to the discharge by means of the discharge opening 43.

When the steam is injected, in practice a laminar flow is produced which, due to the high speed assumed, starts circulating in the annular region 40 where, due to centrifugal force, the liquid parts tend to adhere to the wall, whereas the lighter emulsified parts move towards the center and tend to rise, where the openings 44 allow discharge through the disk 42.

When the injection of steam ceases, the liquid contained in the annular region 40 is discharged immediately through the discharge outlet 41.

From the above description it is thus evident that the invention achieves the intended aim and objects, and in particular the fact is stressed that an emulsifying unit, particularly for emulsifying air and milk to prepare cappuccino and the like, is provided wherein no difficulties arise in forming the air aspiration port, which allows to provide it with a larger and consequently structurally easier size, because it is separated from the steam injection region.

Furthermore, the particular execution of the emulsifying chamber allows to provide a gradual separation of the emulsified parts, keeping the liquid part circulating in the annular region until the feeding of the steam ends and immediate outward discharge of the liquid part is provided.

The invention thus conceived is susceptible of numerous modifications and variations, all of which are within the scope of the inventive concept.

All the details may furthermore be replaced with other technically equivalent elements.

In practice, the materials employed, so long as they are compatible with the specific use, as well as the contingent shapes and dimensions, may be any according to the requirements.

What is claimed is:

1. An emulsifying unit, particularly for emulsifying and heating air and milk by means of steam to prepare cappuccino and the like, said unit comprising:

an emulsifying chamber;

an acceleration duct ending in said emulsifying chamber;

a steam injection nozzle venting in said acceleration duct;

a milk container;

a milk injection duct for drawing milk from said container, said milk injection duct being connected to said acceleration unit;

an air injection port provided at said milk injection duct in a region thereof which is spaced apart from said acceleration duct.

2. Emulsifying unit according to claim 1, wherein said steam injection nozzle is substantially axially aligned with said acceleration duct.

3. Emulsifying unit according to claim 1, wherein said acceleration duct is arranged substantially tangentially with respect to said emulsifying chamber.

4. Emulsifying unit according to claim 1, wherein the size of said air injection port is determined as a function of a cross-section area of said milk injection duct and as a function of its height with respect to said milk container.

5. Emulsifying unit according to claim 4, wherein the size of said air injection port is directly proportional to the cross-section area of said milk injection duct and inversely proportional to said height.

6. Emulsifying unit according to claim 1, comprising, on said milk injection duct, flow adjusting means for adjusting the flow-rate of the milk.

7. An emulsifying unit, particularly for emulsifying and heating air and milk by means of steam to prepare cappuccino and the like, said unit comprising:

an emulsifying chamber, said chamber having a substantially annular body;

an acceleration duct ending along a tangential direction in said annular body and being in fluid communication therewith;

a discharge outlet being provided, substantially axially, in a downward region of said annular body;

a disk arranged in said annular body, said disk being provided with at least one upper opening, said opening allowing feeding of emulsified product on the disk; and a discharge opening being arranged on said disk, in a position above said discharge outlet.

* * * * *